US008996047B2

(12) United States Patent
Merrett

(10) Patent No.: US 8,996,047 B2
(45) Date of Patent: *Mar. 31, 2015

(54) MESSAGING SERVICE IN A WIRELESS COMMUNICATIONS NETWORK

(71) Applicant: Rembrandt Messaging Technologies, LP, Bala Cynwyd, PA (US)

(72) Inventor: Graham Merrett, Queensland (AU)

(73) Assignee: Rembrandt Messaging Technologies, LP, Bala Cynwyd, PA (US)

( * ) Notice: Subject to any disclaimer, the term of this patent is extended or adjusted under 35 U.S.C. 154(b) by 220 days.
This patent is subject to a terminal disclaimer.

(21) Appl. No.: 13/850,272

(22) Filed: Mar. 25, 2013

(65) Prior Publication Data
US 2013/0244702 A1    Sep. 19, 2013

Related U.S. Application Data

(63) Continuation-in-part of application No. 13/762,347, filed on Feb. 7, 2013, which is a continuation of application No. 12/452,883, filed as application No. PCT/AU2008/001043 on Jul. 18, 2008, now Pat. No. 8,401,576.

(30) Foreign Application Priority Data

Jul. 24, 2007    (AU) .............................. 2007903979
Nov. 13, 2007    (AU) .............................. 2007906230

(51) Int. Cl.
*H04W 4/00*    (2009.01)
*H04W 4/14*    (2009.01)
(Continued)

(52) U.S. Cl.
CPC .............. *H04W 4/14* (2013.01); *H04L 12/581* (2013.01); *H04L 12/589* (2013.01);
(Continued)

(58) Field of Classification Search
CPC ....... H04W 4/00; H04W 4/003; H04W 4/005; H04W 4/006; H04W 4/008; H04W 4/12; H04W 4/18; H04W 68/00
USPC ..................... 455/412.1, 412.2, 422.1, 414.1, 455/418–420, 466; 370/310.2, 312, 370/351–356
See application file for complete search history.

(56) References Cited

U.S. PATENT DOCUMENTS 6,678,524 B1    1/2004   Hansson et al.
6,707,472 B1    3/2004   Grauman et al.
(Continued)

FOREIGN PATENT DOCUMENTS

WO         2006006753 A1    1/2006
WO    WO 2006/014603       2/2006

OTHER PUBLICATIONS

Hui Lei, et al., "*Content-Aware Unified Communication*," Mobile Data Management, 2004 Proceedings, 2004 IEEE International Conference, Jan. 19-22, 2004, Berkeley, CA (11 pages).
(Continued)

*Primary Examiner* — Steve D Agosta
(74) *Attorney, Agent, or Firm* — Volpe and Koenig, P.C.

(57) ABSTRACT

This invention concerns a messaging service in a wireless communications network. In a first aspect, the invention is a method for providing a messaging service on a wireless device in a wireless communications network; the method comprising the steps of: Retrieving the destination address of an outgoing message on the device. Verifying whether the destination address is capable of receiving the message via a packet-switched bearer. If verification is affirmative, then automatically sending the message to the destination address via a packet-switched bearer, but otherwise, automatically sending the message to the destination address via an SMS bearer. In another aspect, the invention is a mobile device programmed to perform the method. In a further aspect, the invention is a software program to implement the method.

20 Claims, 7 Drawing Sheets

(51) Int. Cl.
  *H04W 4/18*    (2009.01)
  *H04L 29/06*   (2006.01)
  *H04W 8/18*    (2009.01)
  *H04L 12/58*   (2006.01)
  *H04W 84/12*   (2009.01)
  *H04W 88/06*   (2009.01)

(52) U.S. Cl.
  CPC ............ *H04L 12/5895* (2013.01); *H04L 51/04* (2013.01); *H04L 51/36* (2013.01); *H04L 51/38* (2013.01); *H04W 4/18* (2013.01); *H04L 69/24* (2013.01); *H04W 8/183* (2013.01); *H04W 84/12* (2013.01); *H04W 88/06* (2013.01)
  USPC ............ 455/466; 455/412.1; 455/412.2; 455/422.1; 455/418; 455/419; 455/420; 370/310.2; 370/312; 370/351; 370/356

(56) References Cited

U.S. PATENT DOCUMENTS

| | | | |
|---|---|---|---|
| 6,987,985 | B2 * | 1/2006 | Purkayastha et al. ...... 455/552.1 |
| 7,085,812 | B1 | 8/2006 | Sherwood |
| 7,171,190 | B2 | 1/2007 | Ye et al. |
| 7,277,724 | B2 * | 10/2007 | Jones et al. ................ 455/553.1 |
| 7,298,714 | B2 | 11/2007 | Foster |
| 7,600,031 | B2 | 10/2009 | Toutonghi |
| 7,751,536 | B1 | 7/2010 | Abramson et al. |
| 8,060,566 | B2 | 11/2011 | Appleman |
| 8,412,846 | B2 | 4/2013 | Shao et al. |
| 2002/0077131 | A1 | 6/2002 | Mizell et al. |
| 2003/0040300 | A1 | 2/2003 | Bodic et al. |
| 2006/0018290 | A1 * | 1/2006 | Zhao ............................ 370/335 |
| 2006/0056309 | A1 | 3/2006 | Maaniitty |
| 2006/0167849 | A1 | 7/2006 | Marcus et al. |
| 2009/0305729 | A1 | 12/2009 | Bennett |
| 2010/0131858 | A1 | 5/2010 | Schultz et al. |
| 2011/0039584 | A1 | 2/2011 | Merrett |

OTHER PUBLICATIONS

EP Application No. 08772669.1, Extended Search Report dated Oct. 13, 2011 (10 pages).

PCT/AU2008/001043, International Preliminary Report on Patentability dated Jan. 26, 2010 (7 pages).

* cited by examiner

MESSAGING SERVICE IN A WIRELESS COMMUNICATIONS NETWORK

RELATED APPLICATIONS/PRIORITY CLAIMS

This Application is a continuation in part of and claims priority under 35 USC 120 to U.S. patent application Ser. No. 13/762,347, filed on Feb. 7, 2013 and entitled "Messaging Service In A Wireless Communications Network" which is in turn a continuation and claims priority under 35 USC 120 to U.S. patent application Ser. No. 12/452, 883, filed on Jul. 7, 2010 and entitled "Messaging Service In A Wireless Communications Network" which in turn claims priority to PCT Patent Application No. PCT/AU2008/001043, filed Jul. 18, 2008 and entitled "Messaging Service In A Wireless Communications Network" that in turn claims priority to Australian Patent Application No. 2007903979 filed Jul. 24, 2007, titled, MESSAGING SERVICE IN A WIRELESS COMMUNICATIONS NETWORK and Australian Patent Application No. 2007906230 filed Nov. 13, 2007, titled MESSAGING SERVICE IN A WIRELESS COMMUNICATIONS NETWORK, the entirety of which all of which are incorporated herein by reference.

TECHNICAL FIELD

This invention concerns a messaging service in a wireless communications network.

BACKGROUND ART

Short Messaging Service (SMS) is a technology for sending and receiving short text messages between mobile users. It was first introduced in the Global System for Mobile Communications (GSM) standards in the 1990s but was subsequently included in other wireless standards such as Code Division Multiple Access Systems (CDMA). Although SMS is extremely popular, one of its biggest drawbacks is that an SMS message can only carry a small amount of data due to limitations imposed by the Mobile Application Part (MAP) protocol of SS7. An SMS message can only contain up to 160 8-bit alphanumeric or binary characters and any message longer than 160 characters is usually sent in multiple messages.

A Short Messaging Service Centre (SMSC) is responsible for handling the delivery of SMS messages in a wireless communications network. An SMS message sent by a mobile user is first delivered to the user's network SMSC before being routed to the recipient. If the recipient's network is operated by a different provider or employs a different wireless standards, the message may pass more through more than one SMSC or SMSC gateway before reaching its final destination. Signalling System 7 (SS7) provides the transport mechanism for SMS traffic.

There are several messaging services that provide an extension to SMS. Enhanced Messaging Service (EMS), which uses existing SMS infrastructure, allows up to 255 SMS messages to be packaged as one EMS message having richer content such as animation, pictures, sounds and formatted text. Unlike SMS and EMS, Multimedia Messaging Service (MMS) messages are delivered using a mobile packet data network. MMS was first introduced in 2.5 generation networks such as GPRS, which provides an Internet Protocol (IP) overlay to the existing GSM networks. A multimedia message may contain images, audio clips and videos.

On the other hand, Mobile Instant Messaging (MIM) technology enables mobile devices to engage in real-time, instant messaging via an IP data network. Users need to register a user name tag or "handle" with an instant messaging service provider to send and receive messages. Many current MIM services also require users to maintain a persistent connection with the Internet during a chat session.

DISCLOSURE OF THE INVENTION

In a first aspect, the invention is a method for providing a messaging service on a wireless device in a wireless communications network; the method comprising the steps of:

Retrieving the destination address of an outgoing message on the device.

Verifying whether the destination address is capable of receiving the message via a packet-switched bearer.

If verification is affirmative, then automatically sending the message to the destination address via a packet-switched bearer, but otherwise, automatically sending the message to the destination address via an SMS bearer.

Unlike conventional SMS, EMS and MIM clients, the invention combines existing messaging solutions to offer a single interface for sending and receiving both text and multimedia messages. The automatic bearer selection enables the user to have the widest range of messaging options, including text, voice, video, picture, based on knowledge of the status and capability of the recipient's device.

The SMS bearer may be a conventional GSM SS7 signalling channel. The packet-switched bearer may be a HSDPA, WCDMA, CDMA2000, GPRS or similar data bearer. The packet-switched bearer may also supported by other wireless technologies such as Bluetooth, WiFi, WiMax. Further, the packet-switched bearer may be operated by a sender's mobile operator or an independent mobile Internet service provider. Compared with an SMS bearer, a packet-switched data bearer is able to send a message with unlimited size at a higher speed.

The destination address may be a mobile phone number or a numeric "shortcode" or alias representing one or more, or a combination of, phone numbers, email addresses, instant messaging user handles and IP addresses. Therefore, for all users of the messaging service, and unlike conventional MIM clients, the invention utilises a user's mobile phone number as the identifier of the user, and does not require the user to register a user name, tag or handle, thus providing a single number for message sending.

A message client running on the device may programmatically and dynamically construct an outgoing message in the correct syntax given the user's preferences and given the dynamic requirements of the message server for a particular service.

The message client may interpret incoming SMS or incoming messages from the message server that are identified in their contents as being requirements for the dynamic construction of a message, when the user views the message.

Alternatively, the message client may interpret incoming SMS or incoming messages from the message server that are identified in their contents as being requirements for the dynamic construction of a message, and store the requirements for the dynamic construction of a message, such that they may be invoked by selecting a dynamic menu option.

The requirements may be set out in a structured format using XML such that the message client shall, when a user opens a message containing requirements for the dynamic construction of a message, or when a user selects a dynamic menu:

Present the user with options to choose from; and

For each option, know the intended destination and bearer of the message; and

Prompt the user for input or to select a file to be sent with the constructed message; and Construct a message of the correct syntax based on the user's choices and input.

The method may further comprise the step of connecting to a message server before verifying the destination address. If connection to the message server is not available, the invention may support several configuration methods in order to configure the mobile device so as to be able to establish a connection to the message server.

Firstly, the method may comprise the step of retrieving connection parameters and displaying the retrieved parameters on the mobile device if connection to a message server is not available. A mobile user may then use the retrieved parameters to manually configure the handset before retrying to connect to the message server.

Besides manual configuration, the invention may support manual and automatic over-the-air (OTA) programming. The method may further comprise the step of displaying a link for a sender to request an OTA configuration message if connection to the message server is not available. For example, a user may then access a website to request a configuration message to be sent to the user's mobile device.

The method may further comprise the step of retrieving connection parameters, automatically creating an OTA configuration message based on the retrieved parameters and sending the generated configuration message from the mobile device to the same mobile device. Using such automatic OTA configuration, users do not have to manually change the settings on their mobile device to establish a connection with the message server. The OTA configuration message may be a binary SMS.

The step of verifying the destination address may involve sending an address verification request to a message server and then receiving a notification from the message server specifying whether the destination address is capable of receiving the message via a packet-switched bearer.

The destination address may be capable of receiving the message via a packet-switched bearer if the address is on a subscriber address list. The subscriber address list may be a list of destination addresses that subscribes to the messaging service. The subscriber address list may be maintained by the message server.

The destination address may be capable of receiving the message using a packet-switched bearer if the address is on the subscriber address list and has an active status. For example, the recipient is inactive if the length of the message queue of the destination address exceeds a maximum allowable length.

The method may further comprise the step of automatically providing options to add one or more attachments to the outgoing message before sending the message if a packet-switched bearer is selected. The attachment may be a text, voice, video or picture file. On the other hand, an outgoing message that is sent using an SMS bearer can only be either an SMS or EMS message and not have attachments.

Using the invention, a sender may optimally add attachments to an outgoing message depending on the capability of a recipient's mobile device. For example, a user may attach a voice or video message a text message if the recipient is able to receive and play the attachment. Further, the invention uses a push model to deliver a voicemail to a mobile user without the need of retrieval.

The method may further comprise the step of formatting the outgoing message according to the mode of delivery before sending the message. If the message is sent via a packet-switched data bearer, the message may be formatted as an XML ASCII string.

The method may further comprise the step of appending a system message to the outgoing message if an SMS bearer is selected.

The system message may comprise an invitation to add the destination address to a subscriber address list if the destination address is not on the list. Otherwise, if the destination address is on the subscriber address list but has an inactive status, the system message may comprise an invitation to retrieve messages in the message queue of the destination address.

By sending an invitation to non-subscribers to add their destination address to the subscriber address list, new users may subscribe to the messaging service without having to actively source how to obtain the service. This viral, peer-to-peer invitation method also does not require central monitoring nor generate additional traffic since an invitation is appended to an outgoing message.

The method may further comprise the step of notifying the recipient, if the recipient is on the subscriber list, when either a message has been received (if the recipient is connected to the message server), or when a message is queued but not yet delivered (if the recipient is not connected to the message server). The notification method may be a single ring to the recipient's mobile device. A notification message may also be sent to the sender of the message.

The method may further comprise queuing an outgoing message for later delivery if the message is undelivered. For example, a message cannot be delivered if the destination address is on the subscriber address list, but the recipient is not, at the time of sending, connected to the message server by a packet-switched bearer.

In another aspect, the invention is a mobile device programmed to perform the method. In a further aspect, the invention is a software program to implement the method.

BRIEF DESCRIPTION OF THE DRAWINGS

An example of the invention will now be described with reference to the accompanying drawings, in which.

BEST MODES OF THE INVENTION

Figure 1:
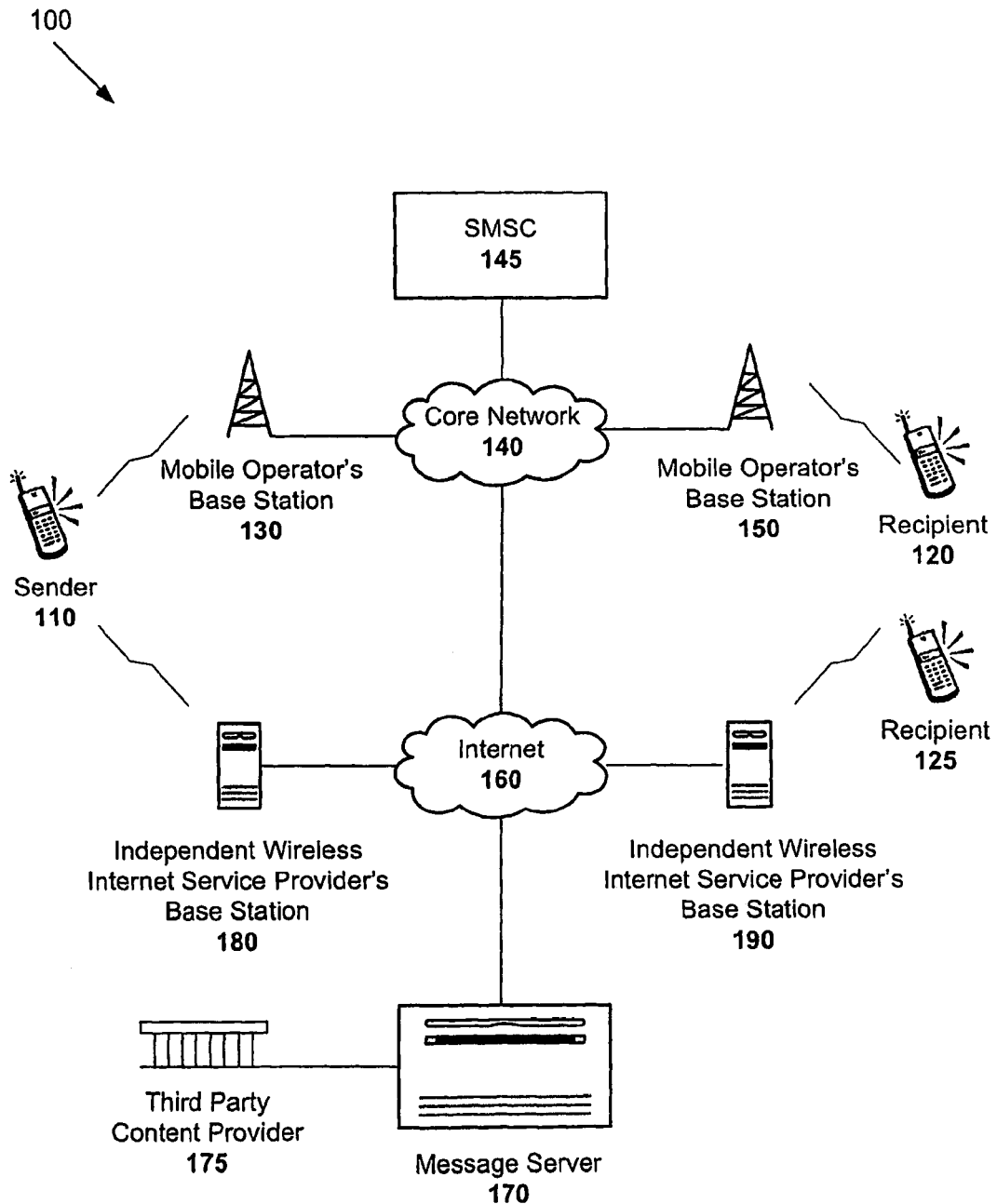
FIG. 1 is a diagram of a messaging system.

Referring first to FIG. 1, the messaging system 100 comprises a message server 170 in communication with network users 110, 120 and 125 via the Internet 160 and base stations 130, 150, 180 and 190. Base stations 130 and 150 are typical based stations in a GSM, CDMA, 3G, 3.5G or similar network that supports a HSDPA, WCDMA, CDMA2000, GPRS or similar data bearer and are connected to an SMSC via Core Network 140.

Network users 110, 120 and 125 may be part of a wireless personal area network (WPAN), a wireless local area network (WLAN) or a wireless wide area network (WWAN). Base stations 180 and 190 are wireless Internet base stations operated by an independent wireless service provider. For example, the users may access the wireless Internet using technologies such as Bluetooth, ZigBee or mesh networking in a WPAN; WiFi in a WLAN or WiMax in a WWAN.

In this example it is assumed that a first user 110 ("the sender") is sending a message to a second user 120 ("the recipient"). The message contains the phrase "Hi there!" as well as a photo and a voicemail as attachments. Referring now to FIG. 2(a), a message client 114 runs on the mobile device 112 and is responsible for choosing the mode of delivery of an outgoing message.

To use the invention, the message client 114 needs to be activated by the sender 110. However, the message client 114 may be also activated automatically when the handset is switched on if such feature is supported by the handset's operating system. Having activated the message client 114, the sender 110 then selects or enters a destination number. The message client 114 then decides on how the message can be sent.

The recipient 120 may be on a network operated by the same or a different service provider. The sender and the recipient are each associated with an address. The destination address is either a mobile phone number or a numeric "shortcode" or "channel", which is an alias representing one or more phone number, email address or instant message handle. For example, certain number ranges may be controlled by the messaging server (e.g. 1 800 xxxxxx), some under users' control as destinations as aliases for a group of numbers and addresses (e.g. 1 801 xxxxxx), and some for accessing content services (e.g. 1 900 xxxxxx). Shortcodes are unique and private to a user, hence the same numeric shortcode may be used by multiple users.

Shortcodes are created by users and maintained by message server 170. For example, a user creates a shortcode by sending a message with the following content to the message server 170:

Add channel 20 andrew@messmo.com, robert@yahoo.com, 0423789080, 98765432@jabber.org.

The shortcode 20 is an alias for a group comprising two email addresses, one mobile number and an instant message handle. For example, to send a message to the shortcode created, the destination address will be set to 1801 20.

The syntax of messages in the example above is strict, however the user is not limited in their use of services by limits in their own knowledge of the message syntax.

The message client 114 is able to programmatically and dynamically construct an outgoing message in the correct syntax given the user's preferences and given the dynamic requirements of the message server 170 for a particular service.

The message client 114 interprets incoming SMS or incoming messages from the message server 170 that are identified in their contents as being requirements for the dynamic construction of a message. The interpretation can occur either when the user views the message (for example a message titled "Click to create a Channel"), and/or the message client may interpret the incoming SMS, or incoming messages from the message server 170, and store the requirements for the dynamic construction of a message, such that they may be invoked by selecting a dynamic menu option.

The requirements are set out in a structured format using XML such that the message client 114 shall, either when a user opens a message containing requirements for the dynamic construction of a message, or selects a dynamic menu:

Present the user with options to choose from; and

For each option, know the intended destination and bearer of the message; and

Prompt the user for input or to select a file to be sent with the constructed message; and Construct a message of the correct syntax based on the user's choices and input. If the message contained requirements for the dynamic construction of a message, where those requirements are by way of example set out as:

```
<MessageConstructorRequirements>
    <MCTitle>Shortcode</ MCTitle >
    <Option>
        <OptionTitle>Subscribe</ OptionTitle>
        <Bearer>SMS</Bearer>
        <Destination>1800</Destination>
        <OutputToken DataType='String' InputMethod='Constant'
        Count='1'>Add Channel</OutputToken>
        <OutputToken DataType='Number' InputMethod='Input'
        Count='1'>Channel</OutputToken>
        <OutputToken DataType='String' InputMethod='Input'
        Count='4'>Destination</OutputToken>
    </Option >
</ MessageConstructorRequirements >
```

The message client 114 would present the user with a message titled 'Shortcode', where the message client would:

Present the user with the option 'Subscribe'; and if this option is selected

Prompt the user for one shortcode eg. User inputs 20; and

Prompt the user for four destinations eg. User inputs andrew@messmo.com, robert@yahoo.com, 0423789080, 98765432@jabber.org; and Construct a message eg. 'Add Channel 20 andrew@messmo.com, robert@yahoo.com, 0423789080, 98765432@jabber.org' to be sent to 1900 via SMS bearer.

Thus enabling the benefit to the user of the use of a service where they otherwise may have been unfamiliar with, or unwilling to input, the strict syntax of the message required for the service.

When a message is sent to a shortcode, the message can be sent either as a conventional SMS or EMS message using a conventional SMS bearer or a packet-switched data bearer. If a SMS bearer is used, the message will be sent via a GSM or GPRS signalling channel to Core Network 140, SMSC 145, base station 150 before finally reaching recipient 120. If an SMS bearer is used the attachments such as the photo and voicemail will not be sent.

If a packet-switched data bearer is used, the message client has a choice of sending the message using a packet-switched bearer supported by the mobile operator's or a third party's network. For example, in a GSM system with General Packet Radio Service (GPRS) overlay, an SMS bearer may be an SS7 signalling channel while a packet-switched data bearer may be a shared transmission channel that combines multiple timeslots in a GSM TDMA frame. The packet-switched data bearer may also be a Bluetooth, WiFi, WiMax or any other WPAN, WLAN, or WWAN wireless data transfer protocol.

Figure 3:
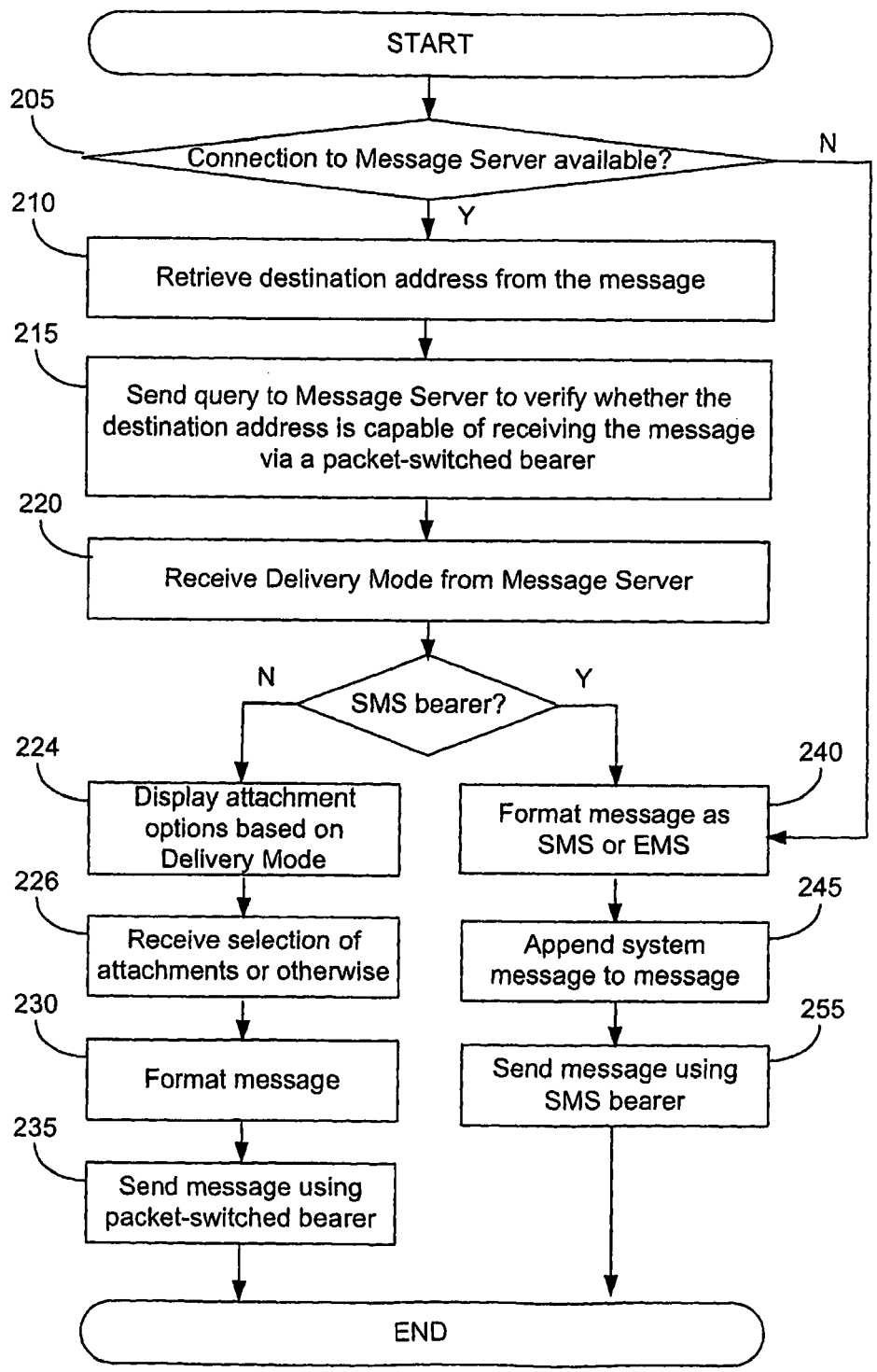
FIG. 3 is a flowchart of the routine performed by a message client.

Referring now to FIG. 3, the client 114 first checks whether the sender 110 is connected to the Internet 160 and message server 170; see step 205. As shown in FIG. 1, the sender 110 may be connected to the message server 170 via a mobile operator's data network (base stations 130) or a network provided by an independent mobile Internet service provider (base station 180).

Figure 4:
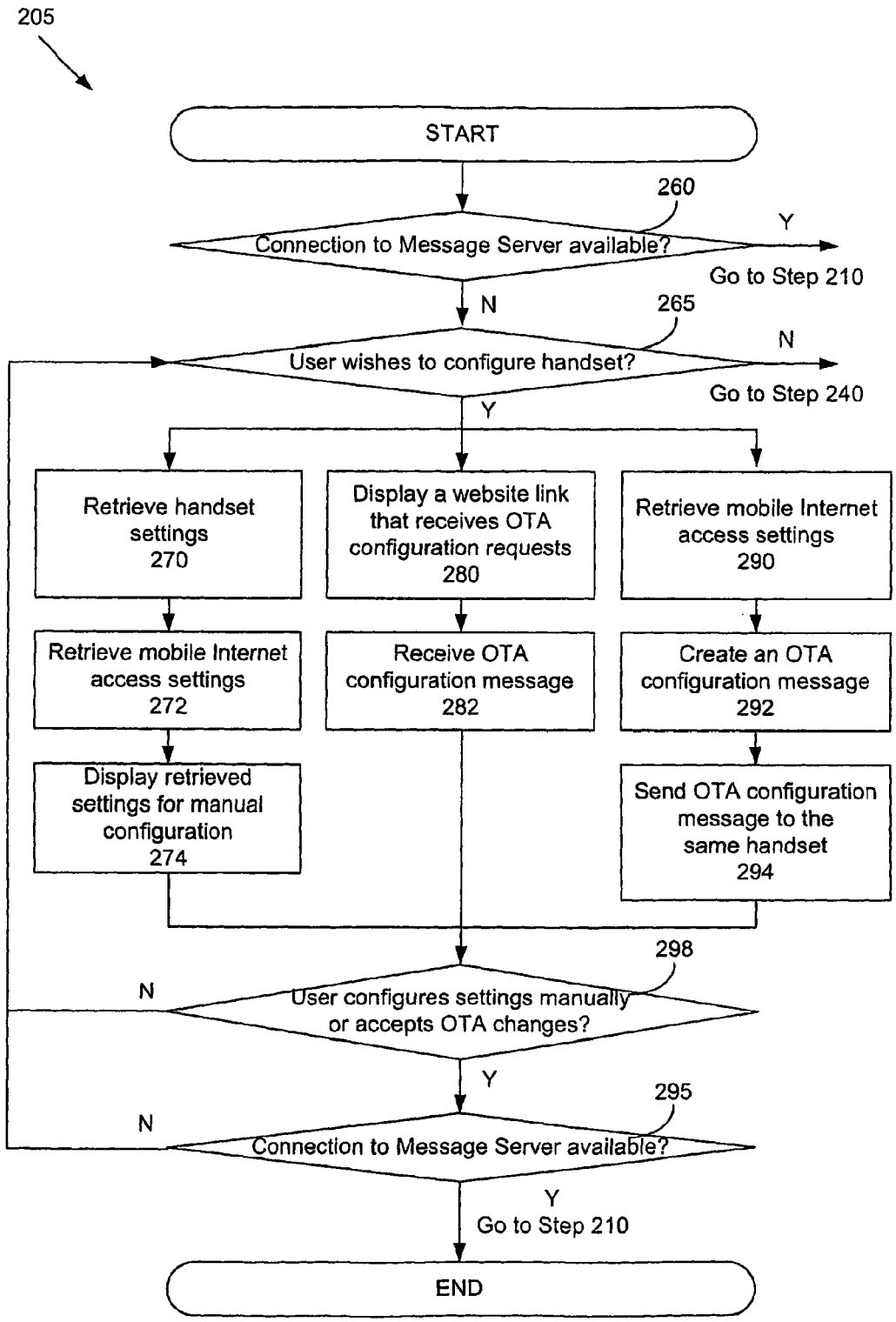
FIG. 4 is a flowchart of the routine performed by a message client to establish a connection with a message server.

The step of connecting to the message server 170 (step 205) will now be explained with reference to FIG. 4. The client 117 first checks whether connection to the message server 170 is available. If the connection is not available, the client 117 displays options for the sender 110 to configure the handset such that connection to the message server 170 can be established; see step 265.

The client 117 supports three configuration methods. Firstly, manual configuration may be used; see steps 270, 272 and 274. In this case, the client 117 first retrieves information specific to the handset and the mobile Internet service provider. As mentioned, the mobile Internet service provider may be a mobile operator or an independent provider. The client 117 then displays the retrieved information such that the sender 110 can configure the handset manually; step 274.

Alternatively, if the sender's mobile device is capable of receiving and processing OTA messages, the client 117 may provide a link to a website that solicits OTA configuration requests; steps 280 and 282. The website may be operated by the message server 170 or a third party and accessed via a PC, WAP connection from the sender's mobile device or other means. Upon receiving the OTA configuration message, the sender's mobile device will ask the sender to accept the changes to its mobile Internet access settings according to the configuration message; step 298. If the changes are accepted, the client 117 then retries to connect to the message server 170; step 295.

Besides manual configuration and manual OTA configuration requests, the client 117 is capable of performing self-configuration; see steps 290, 292 and 294. Assuming that the client 117 is aware of the specific parameters necessary to configure the sender's mobile device to access the mobile Internet, the client 117 first creates an OTA configuration message based on the parameters. The client 117 then sends the OTA message to the sender's handset (same device). For example, the message may be sent as an OTA binary SMS. Upon receiving the OTA configuration message, the sender's mobile device asks the sender to accept the changes to its mobile Internet access settings according to the configuration message; step 298. Similarly, the client 117 then retries to connect to the message server 170 when under the new settings; step 295.

The above configuration steps may be repeated until either the message server 170 is connected or the user has abandoned the configuration in step 265. In this case, that is the connection to the message server 170 is not available, the client 117 will select an SMS bearer as the mode of delivering the outgoing message and proceeds to format the message in step 240. Note that besides configuring the mobile Internet access settings of a mobile device, the client 117 may generate OTA messages to configure other settings such as email, WAP, MMS and video streaming.

If the sender has access to the message server 170, the client 114 then retrieves from the message without reference to the message server the destination address of the outgoing message 220; see step 210. Alternatively, the system and method may retrieve the destination address from a contact list or address book of the sender that may be resident on the sender's computing device 110 or on the message server 170.

The client then sends a verification request to the message server 170 via base station 130 or 180 and the Internet 160; step 215. Upon receiving an address verification request, the message server 170 performs the method shown in FIG. 5. The message server 170 first checks whether the destination address is on a list of subscribing addresses; step 320. If the destination address is not known to the message server 170, the mode of delivery will be set to an SMS bearer; step 350.

If the destination is on the list of subscribing addresses, the message server 170 proceeds to check the status of the recipient, that is whether the destination message queue length has exceeded a predetermined maximum length; 330. If the recipient has a long inactive queue, the message server 170 will notify the message client 114 to send the message using an SMS bearer; see step 350. Otherwise, the mode of delivery is set to a packet-switched bearer; see step 360 in FIG. 5.

Referring to FIG. 3 again, the message client 114 at the sender 110 provides options for format and attachment of the outgoing message based on the mode of delivery; steps 224, 226, 230 and 240. The mode of delivery, using information about the recipient's handset stored in the message server, provides an indication of the capabilities of the recipient's handset and the type of message that can be received by the recipient's 120. If the recipient 120 is an active user, the full range of the recipient's capabilities is assumed. However, if the recipient 120 is an inactive or past subscriber, the message server's 170 knowledge of the recipient's capabilities may be outdated if the recipient has changed its handset. The recipient 120 may then be invited to update its information.

The message client 114 then intelligently advises the sender 110 whether the recipient 120 is able to read attachments or non-text messages. For example, if the mode of delivery is a packet-switched bearer, the sender 110 is offered with the "ATTACH" option to add voice, picture or video attachments to the message; see FIG. 2(*a*) and steps 224 and 226 in FIG. 3.

If the mode of delivery is an SMS bearer, the "ATTACH" option will be disabled. Further, depending on configurable settings on the sender's mobile device, the client 117 also appends a system message to the outgoing message in step 245. If the destination address is not on the list of subscribing addresses, an invitation to download the client will be added to the outgoing SMS or EMS. For example, the invitation may read:

"Go to www.clientdownload.com to download <name of message client>".

The message client 114 can then be downloaded to the recipient's mobile device 120. Then upon starting the message client, the message client will generate a unique authentication identifier, either randomly or derived from the mobile devices hardware identification or generated by the message server. The message client will then initiate a connection to the message server and communicate the authentication identifier. The message client will in parallel send a SMS containing the authentication identifier to a SMS gateway service. The SMS gateway service then sends the message, including the originating phone number and the body of the message containing the authentication identifier, to the message server via HTPP, SMTP, SMPP or a similar protocol.

Upon receipt of the details of a SMS, the message server will determine the originating phone number of the mobile device from the details of the SMS, and hence add the new address (originating phone number) to the list of subscribing addresses. By matching the authentication identifier, either the message server will send the message client confirmation that the mobile device and user has been authenticated, or the message client will initiate the action and request the same confirmation from the message server. This authentication method allows new users to be authenticated and to subscribe to the messaging service via one SMS without requiring any registration or data entry.

Figure 6:
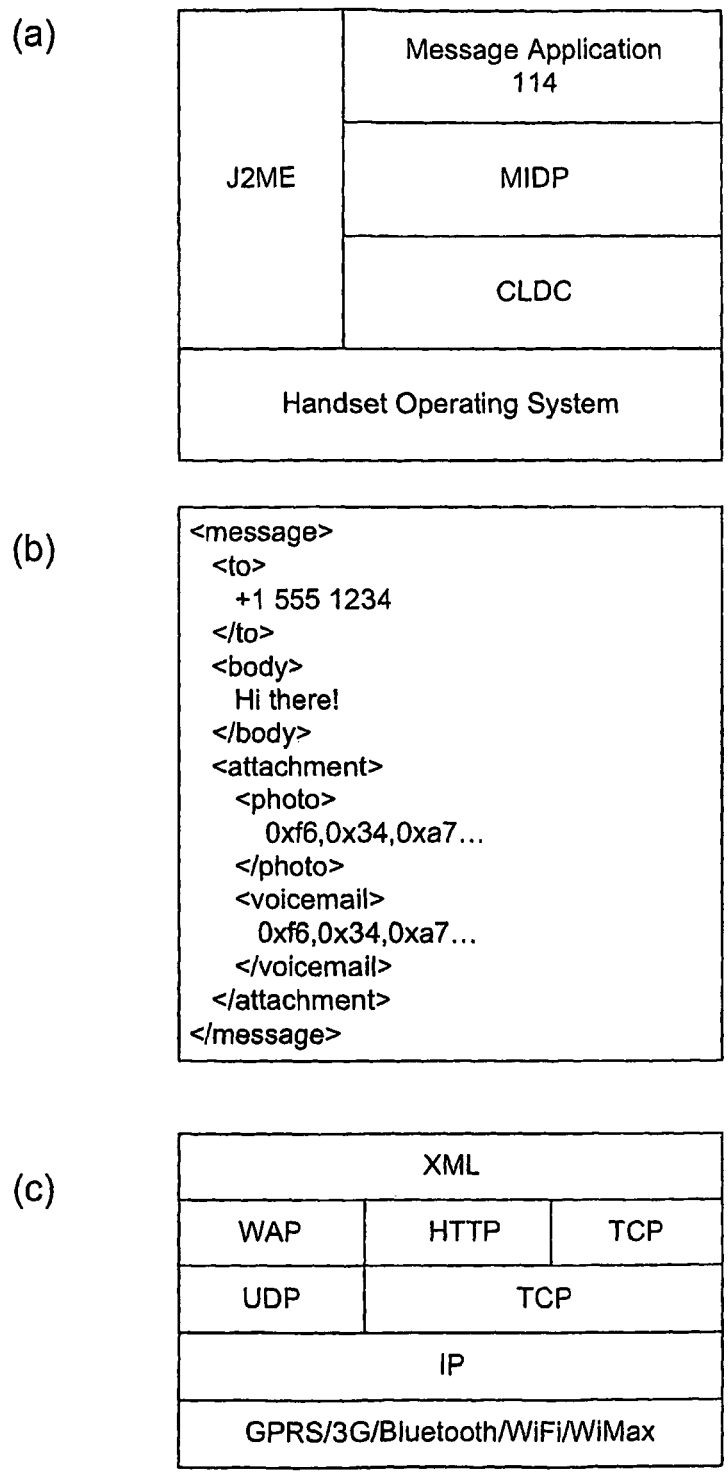
FIG. 6(a) is a diagram of the architecture of a message client.
FIG. 6(b) is an exemplary message format.
FIG. 6(c) is a diagram of a TCP/IP protocol model used by a message client.

If the destination address is on the list of subscribing addresses but the recipient 120 is inactive, a message to remind the recipient 120 to connect to the message server 170 will be appended to the outgoing SMS or EMS. For example, the system message may read:

"You have 50 unread messages on <name of message client>." Returning to the sending mobile device 110, if the mode of delivery is a packet-switched bearer, the message client manages the delivery of the message similar to a MIM client such as Jabber. An exemplary architecture of the message client is shown in FIG. 6(*a*), where the message client may be a Java 2, Mobile Edition (J2ME) program installed on a mobile device. The formatted message is sent as an XML ASCII string via a TCP/IP socket to the message server or a HTTP post, an example of which is shown in FIG. 6(*b*). The message contains a text phrase "Hi there!" in the body and two attachments. A photo attachment is defined between <photo> and </photo> and a voicemail is defined between <voicemail> and </voicemail>.

The sending of the message using SMS bearer or a packet-switched bearer as shown in FIG. 3 and described above is one example of how the message may be sent to the recipient. The system and method may also send the message in other ways. For example, the message to be sent may be stored in a database or other storage device and then the recipient can retrieve the message from the database or other storage device. The system may also have a mechanism that notifies the recipient when a message is waiting, and as part of such notification delivers the message, such as an alert, using push notification and the like. Furthermore, a message to be sent may be sent using a keep alive connection used for notifications. As another example, the message may be stored in the cloud (using cloud computing resources) and the recipient may retrieve the message by making an application programming interface (API) call or a function call on a server. Furthermore, the system may use other services that would allow the recipient to get the message from the sender. As another example, the message be sent, and received using a well known peer to peer connection between the sender device and the recipient device.

Furthermore, as an alternative to sending the message to the recipient using an SMS bearer, the system may also allow the sender to send an invitation to the recipient via SMS. The invitation may be to download and/or install the messaging client to be able to receive the message over a packet switched bearer or connect to a service that allows the recipient to retrieve the message.

FIG. 6(*c*) illustrates the five-layer TCP/IP protocol model used by the message client. GPRS, 3G, 3.5G or other wireless protocols such as Bluetooth, WiFi and Wimax are used in the data link layer to deliver the message from the mobile device to the wireless communications network, IP is used in the network layer to deliver the packet from the sender to the recipient, UDP and TCP form the transport layer and HTTP, WAP and XML are used in the application and presentation layers.

Figure 2:
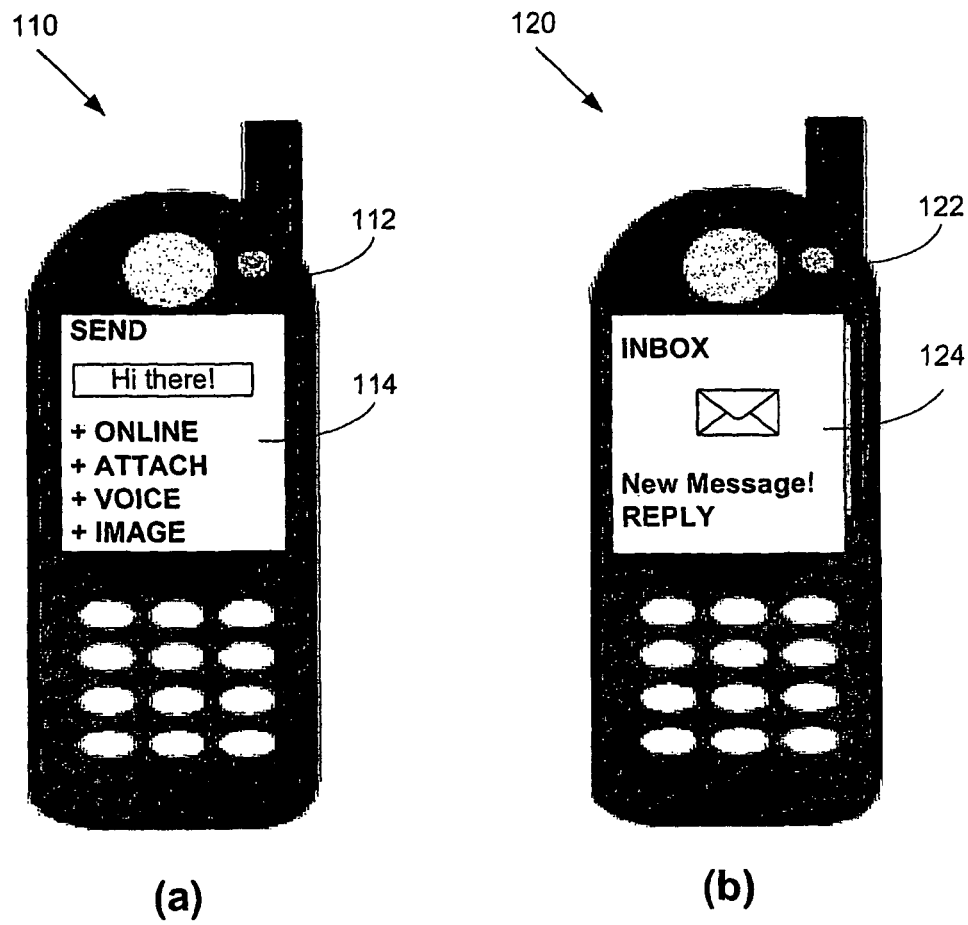
FIG. 2(a) is the user interface on a sender's mobile device.
FIG. 2(b) is the user interface on a recipient's mobile device.

FIG. 2(*b*) shows the user interface of the recipient 120 when a message is received. The recipient 120 may receive a notification when the message has been successfully received as the recipient while being connected to the messaging server, may be using another function of the mobile device. The notification may be a single ring of the recipient's mobile device.

Figure 5:
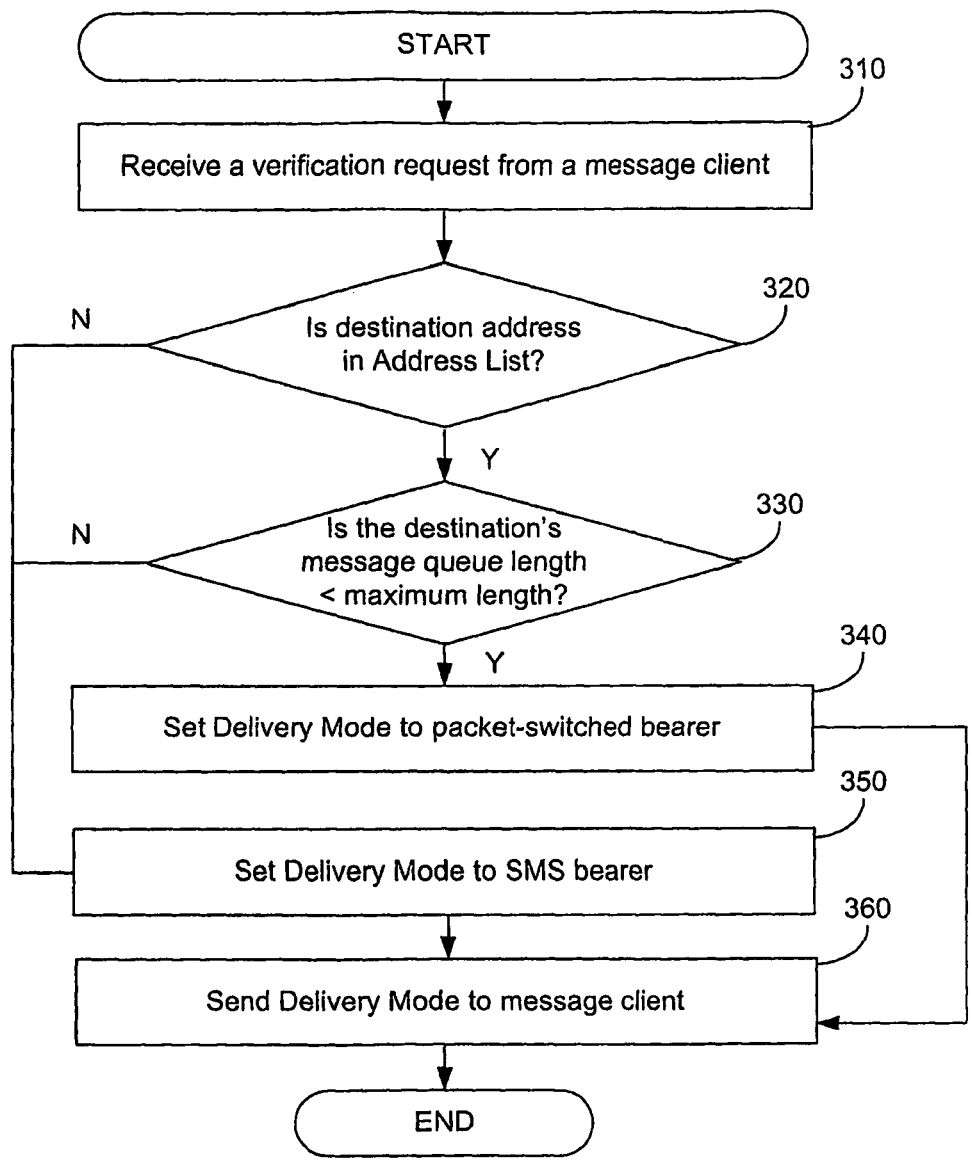
FIG. 5 is a flowchart of the address verification routine performed by a message server.

If the destination address is a shortcode, steps 320 and 330 in FIG. 5 are repeated for each phone number, email address and user name tag represented by the shortcode. If not all addresses in the shortcode are capable of receiving the message via a packet-switched data bearer, the reply by message server 170 may be an array of binary answers. For example, if a shortcode represents three addresses and only the first has installed the message client, the mode of delivery is set to $m_1 m_2 m_3 = 100$, where 1 represents a packet-switched bearer and 0 represents an SMS bearer.

A delivery confirmation message may also be sent to the sender 110 by the message 170 if the message is sent using a packet-switched bearer. The message client 114 maintains a copy of recent messages sent by a user, for example, for a limited time. If a message is unsuccessfully delivered, it will be queued for later delivery. For example, a message cannot be delivered if the recipient 120 is not connected to the message server 170 when the message is sent. In this case the recipient 120 may receive a notification that a message is queued for later delivery. The notification may be a single ring of the recipient's mobile device, generated by the message server 170, but using a different originating number from that used for the notification when the message has been delivered, so as to enable the user to optionally utilise mobile device features such as distinct ringtones mapped to sending numbers.

Figure 7:
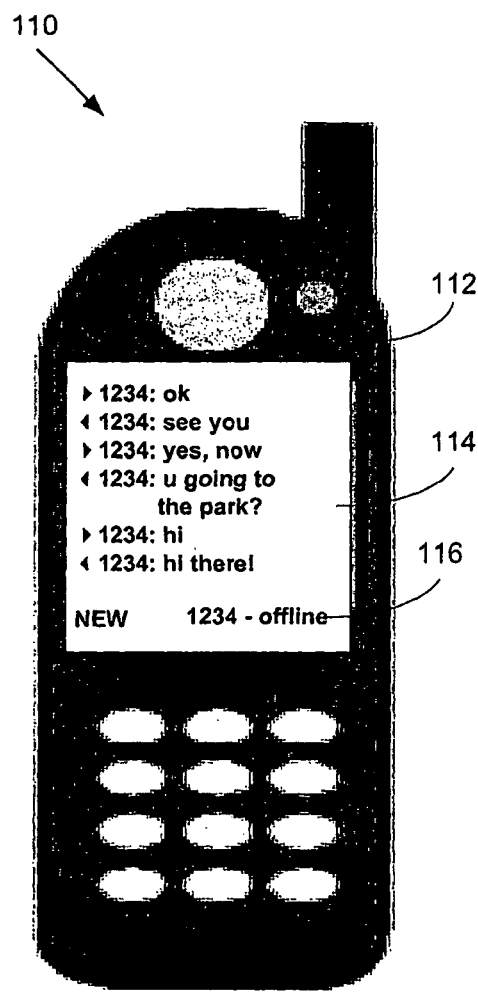
FIG. 7 is the user interface on a sender's mobile device during a chat session.

A sender 110 and a recipient 120 may send and receive multiple messages during a chat session. The user interface may be similar to that of a desktop instant messaging program. For example, an exemplary user interface of sender 110 is shown in FIG. 7. A left arrow indicates a message sent by the sender while a right arrow represents a received message. Depending on configurable user preferences, the recipient 120 with phone number 1234 may choose to have his or her presence known to the sender 110; see 116 in FIG. 7. Using the presence information, the sender 110 may then stop sending new messages to the recipient 120 if the latter has gone offline.

Besides performing address verification, the message server 170 also maintains user authentication. Authentication is simple and does not require a user to create a user name tag like existing MIM servers. Instead, the user's mobile phone number is the default identifier. Authentication adds the mobile phone number to the subscriber address list.

Referring to FIG. 1 again, the message server 170 receives each message that is sent using a packet switched bearer. Each message is in an XML format. and the message server parses the message to determine the destination address.

The message server 170 is also in communication with third-party content providers 175 over the Internet 180. When the message server identifies a destination address corresponding to a third party content provider, it automatically sends the message to the third party. The third party may, for example depending on the presence of keywords, send additional information related to the keywords to the sender 110. However, a user may disable this feature.

For example, if the message contains the name of a certain brand, BUYME, information concerning where to buy the product or its latest promotion will be retrieved from the third party content provider in communication with the message server. In this case, depending on the capability of the recipient's mobile device, the information may be sent as a conventional SMS or as a text message via a packet-switched bearer, with optionally one or more attachments.

User privacy may be protected by not revealing a user's phone number to a third party without the consent of the user. For example, a user may send a query to a third party content provider 175 to ask about the weather forecast in a particular location via the message server 170. To hide a user's identity, the message server may dynamically create a random number that maps to the user's actual mobile number and passes the query to the third party content provider 175. Further, this mapping may be dynamic, not static, to ensure that the third party is not able to determine information about the general behaviour of the users.

Similar to user-to-user messages, the type of advertising and marketing message that is sent to a user also depends on the capabilities of the user's handset. Therefore since the message server is aware of the capabilities of user's handsets, as user handsets are upgraded, the message server 170 is able to target those users with enhanced, multimedia message content.

It will be appreciated by persons skilled in the art that numerous variations and/or modifications may be made to the invention as shown in the specific embodiments without departing from the spirit or scope of the invention as broadly described. For instance, the current application outlines how a user, when using a message client, will be prompted to use an SMS, if the recipient is not a user of the message service. The existing context of this is that the user is initiating the message. The functionality can be extended to the situation where a message is sent using the message client with the goal of prompting the user to send a response SMS. This can be useful in generating SMS traffic from third parties by sending one message that prompted the recipients to select one or more voting buttons each of which causes an SMS to be sent to a specific premium number.

Conversely the same concept works well for a community of users of a message client who do not wish to use premium numbers. The entire community can be polled. Each receives an indication to select a voting button, and the selections each cause a message with predetermined text to be sent to a predetermined recipient. This minimises the event of false responses that cannot be counted.

The present embodiments are, therefore, to be considered in all respects as illustrative and not restrictive.

The invention claimed is:

1. A method of providing a messaging service for use in a wireless device of a sender, the method comprising:
    receiving, by a message client running on the wireless device of the sender, information associated with a destination address of a wireless device of a recipient from an outgoing message, an address book, or a contact list, the message client capable of determining a transmission mode for sending the outgoing message to the wireless device of the recipient, wherein the wireless device of the sender is capable of sending messages in a plurality of transmission modes comprising a first transmission mode and a second transmission mode;
    determining, by the wireless device of the sender, whether the destination address corresponds to a subscriber of a service for receiving the outgoing message via a packet switched bearer by sending a request via a packet switched wireless local area network (WLAN) base station to a server, and receiving a response from the server via the packet switched WLAN base station, the response providing an indication of whether the destination address corresponds to a subscriber of the service;
    selecting, by the wireless device of the sender, a transmission mode from the plurality of transmission modes, wherein the wireless device of the sender selects the first transmission mode when the indication corresponds to a subscriber of the service, and the wireless device of the sender is capable of selecting the second transmission mode when the indication does not correspond to a subscriber of the service;
    sending, by the wireless device of the sender, the outgoing message using the selected transmission mode,
    wherein, when the selected transmission mode is the first transmission mode, the wireless device of the sender sends the outgoing message as one or more Internet protocol (IP) packets to the wireless device of the recipient via the packet switched WLAN base station,
    wherein, when the selected transmission mode is the second transmission mode, the wireless device of the sender sends the outgoing message as a short message service (SMS) message to the wireless device of the recipient using the destination address via a base station that is associated with a cellular core network that is independent of the packet switched WLAN base station, and
    wherein the request sent to the server and the response received from the server do not traverse the cellular core network.

2. The method of claim 1, further comprising:
    displaying, by the wireless device of the sender, a result of the indication of whether the destination address corresponds to a subscriber of the service.

3. The method of claim 1, further comprising:
    selecting, by the wireless device of the sender, at least one type of permissible attachment based on whether the destination address corresponds to a subscriber of the service.

4. The method of claim 1, further comprising:
    denying, by the wireless device of the sender, when the destination address does not correspond to a subscriber of the service, any type of attachment.

5. The method of claim 1, wherein the destination address is a mobile phone number.

6. The method of claim 1, further comprising:
    queuing the outgoing message for later delivery if the outgoing message cannot be delivered to the wireless device of the recipient.

7. The method of claim 1, further comprising:
    receiving, by the wireless device of the sender, a delivery confirmation message, via the packet switched WLAN base station, if the outgoing message is successfully delivered to the wireless device of the recipient, when the destination address corresponds to a subscriber of the service.

8. The method of claim 7, further comprising:
    displaying, by the wireless device of the sender, a delivery indication based on the received delivery confirmation message.

9. The method of claim 1, further comprising:
    displaying, by the wireless device of the sender, sent messages and received messages, wherein sent messages are displayed with a first characteristic and received message are displayed with a second different characteristic so as to distinguish the sent messages from the received messages.

10. The method of claim 1, further comprising:
    receiving, by the wireless device of the sender, presence information associated with the wireless device of the recipient if the destination address corresponds to a subscriber of the service; and
    displaying, by the wireless device of the sender, the presence information associated with the wireless device of the recipient.

11. A method of providing a messaging service for use in a wireless device of a sender, the method comprising:

receiving, by a message client running on the wireless device of the sender, information associated with a destination address of a wireless device of a recipient from an outgoing message, an address book, or a contact list, the message client capable of determining a transmission mode for sending the outgoing message to the wireless device of the recipient, wherein the wireless device of the sender is capable of sending messages in a plurality of transmission modes comprising a first transmission mode and a second transmission mode;

determining, by the wireless device of the sender, whether the destination address corresponds to a subscriber of a service for receiving the outgoing message via a packet switched bearer by sending a request via a packet switched wireless local area network (WLAN) base station to a server, and receiving a response from the server via the packet switched WLAN base station, the response providing an indication of whether the destination address corresponds to a subscriber of the service;

selecting, by the wireless device of the sender, a transmission mode for sending the outgoing message to the wireless device of the recipient from the plurality of transmission modes, wherein the wireless device of the sender selects the first transmission mode when the indication corresponds to a subscriber of the service, and the wireless device of the sender is capable of selecting the second transmission mode when the indication does not correspond to a subscriber of the service, wherein the wireless device of the sender is capable of sending, in the first transmission mode, the outgoing message as one or more Internet protocol (IP) packets to the wireless device of the recipient via the packet switched WLAN base station, wherein the wireless device of the sender is capable of sending, in the second transmission mode, the outgoing message as a short message service (SMS) message to the wireless device of the recipient using the destination address via a base station that is associated with a cellular core network that is independent of the packet switched WLAN base station, and wherein the request sent to the server and the response received from the server do not traverse the cellular core network.

12. The method of claim 11, further comprising:
displaying, by the wireless device of the sender, a result of the indication of whether the destination address corresponds to a subscriber of the service.

13. The method of claim 11, further comprising:
selecting, by the wireless device of the sender, at least one type of permissible attachment based on whether the destination address corresponds to a subscriber of the service.

14. The method of claim 11, further comprising:
denying, by the wireless device of the sender, when the destination address does not correspond to a subscriber of the service, any type of attachment.

15. The method of claim 11, wherein the destination address is a mobile phone number.

16. The method of claim 11, further comprising:
queuing the outgoing message for later delivery if the outgoing message cannot be delivered to the wireless device of the recipient.

17. The method of claim 11, further comprising:
receiving, by the wireless device of the sender, a delivery confirmation message, via the packet switched WLAN base station, if the outgoing message is successfully delivered to the wireless device of the recipient, when the destination address corresponds to a subscriber of the service.

18. The method of claim 17, further comprising:
displaying, by the wireless device of the sender, a delivery indication based on the received delivery confirmation message.

19. The method of claim 11, further comprising:
displaying, by the wireless device of the sender, sent messages and received messages, wherein sent messages are displayed with a first characteristic and received message are displayed with a second different characteristic so as to distinguish the sent messages from the received messages.

20. The method of claim 11, further comprising:
receiving, by the wireless device of the sender, presence information associated with the wireless device of the recipient if the destination address corresponds to a subscriber of the service; and
displaying, by the wireless device of the sender, the presence information associated with the wireless device of the recipient.

* * * * *